J. N. TIFFT, dec'd, & W. LOVE,
J. V. TIFFT & W. C. BRYANT, Executors of J. N. TIFFT.
Valve-Gear for Steam-Engine.
No. 8,047. Reissued Jan. 22, 1878.
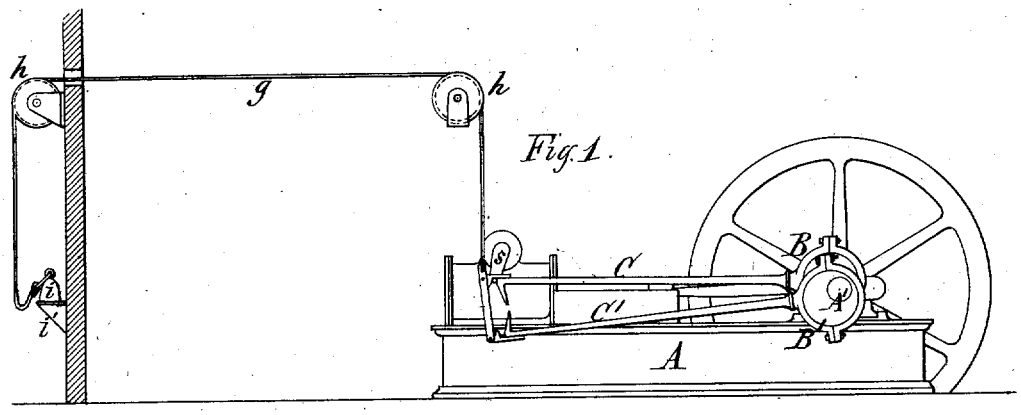
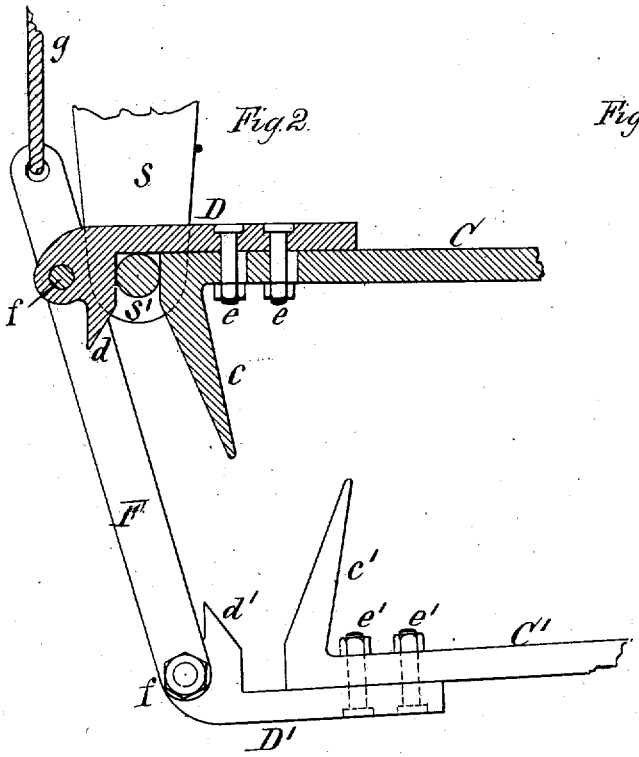
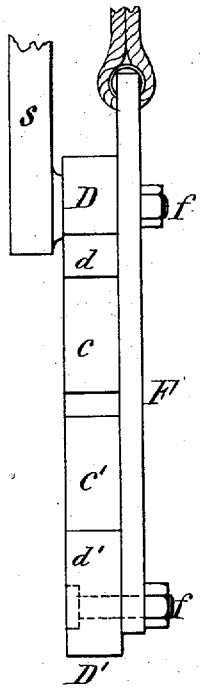
John V. Tifft & Wm. C. Bryant, Executors of Jno. N. Tifft, dec'd. and William Love
by Wilhelm & Bonnell Attorneys.
M. F. Kennedy
Chas. J. Buchholz
} Witnesses.
N. PETERS, PHOTO-LITHOGRAPHER, WASHINGTON, D. C.

UNITED STATES PATENT OFFICE.

JOHN V. TIFFT AND WILLIAM C. BRYANT, (EXECUTORS OF JOSEPH N. TIFFT, DECEASED,) AND WILLIAM LOVE, OF BUFFALO, NEW YORK.

IMPROVEMENT IN VALVE-GEARS FOR STEAM-ENGINES.

Specification forming part of Letters Patent No. 125,769, dated April 16, 1872; Reissue No. 8,047, dated January 22, 1878; application filed December 10, 1877.

*To all whom it may concern:*

Be it known that JOSEPH N. TIFFT and WILLIAM LOVE, both of the city of Buffalo, in the county of Erie and State of New York, did invent certain Improvements in Valve-Gears for Steam-Engines, of which the following is a specification:

The improvements relate to that class of steam-engines which are provided with two eccentrics for running the engine in one or the other direction, and which are generally known as "reversible" engines.

The invention consists, first, in the combination, with the eccentric-rod having a fixed or stationary guide-arm, of an end piece and guide-arm capable of longitudinal adjustment on the eccentric-rod, so as to compensate for the wear of the jaws which engage with the pin of the valve rod or lever; second, in the combination, with two eccentric-rods having fixed guide-arms and adjustable end pieces, of a bar or link for connecting the ends of both eccentric-rods, so as to be simultaneously operated, and for retaining them at the proper distance apart; third, in the combination, with the eccentric-rods so connected with the valve arm or rod that their forward ends will descend by gravity when released, of a cord or rope and suitable guide-rollers for reversing the engine at a considerable distance therefrom.

In the accompanying drawings, Figure 1 is a side elevation of a steam-engine provided with the said improvements. Fig. 2 is a detached view, on an enlarged scale, of the ends of the eccentric-rods and connecting-bar. Fig. 3 is a front elevation thereof.

Like letters of reference designate like parts in each of the figures.

A represents a reversible steam-engine of any ordinary or well-known construction; A′, the driving-shaft; B B′, the eccentrics mounted thereon, and C C′ the respective eccentric-rods. In the drawing, the engine is shown provided with a rocking valve, *s* being the actuating arm or lever thereof, and *s′* the pin with which the eccentric-rods engage. *c* is an inclined downwardly-projecting guide-arm formed with the end of the eccentric-rod C, and *c′* a similar upwardly-projecting guide-arm formed at the end of the eccentric-rod C′. D is the adjustable end piece secured to the eccentric-rod C. It is provided with a square shoulder, corresponding with the end of the eccentric-rod, so that the pin *s′* snugly fits between both, as clearly shown in Fig. 2. *d* is an inclined downwardly-projecting guide formed with the end piece D. The latter is secured to the eccentric-rod C by bolts *e*, passing through elongated holes in the eccentric-rod, to allow of longitudinal adjustment of the end piece D as the bearing-surfaces in contact with the pin *s′* become worn. D′ is a similar end piece, having a guide-arm, *d′*. It is adjustably secured to the eccentric-rod C′ by bolts *e′*. F is a link or bar connecting the ends of the eccentric-rods C C′, to which it is secured by bolts *f*, or in any other suitable manner. *g* is a cord or rope, preferably a wire-rope, secured to the upper end of the bar F, and passing over suitable guide-rollers *h* to the point at which the attendant is stationed.

When the upper eccentric-rod C operates the valve, as shown in Fig. 1, the weight of the parts keeps the upper eccentric-rod C engaged with the valve-lever *s*. By pulling the cord *g* so as to disengage the rod C and engage the rod *c′* with the valve-lever *s*, the engine is reversed; and to retain the valve-gear in this position, the rope *g* is attached to a weight, *i*, sufficient to overcome the weight and pressure of the valve-gear. The weight is placed upon a support, *i′*, when the rope is required to be loose. Instead of the weight *i*, a spring-hook, or other suitable locking device, may be employed for retaining the valve-gear in the upper position. Upon releasing the cord *g* the parts are returned to their former position by the forward ends of the eccentric-rods descending by their own weight until the upper or forward eccentric-rod C rests on the pin of the valve-arm D, when the parts remain in that position.

The above-described device enables the engine to be reversed at a considerable distance, whereby a special attendant in the engine-room can be dispensed with, and the attachment of the valve-gear to the rope *g* has the further advantage of allowing the valve-gear all possible freedom of movement.

What is claimed as the invention of JOSEPH N. TIFFT and WILLIAM LOVE is—

1. The combination, with the valve-rod of a steam-engine, of the eccentric-rod C, provided with a guide-arm, *c*, and the adjustable end piece D, provided with a guide-arm, *d*, substantially as hereinbefore set forth.

2. The combination, with the eccentric-rods and guides C C′ *c c′ d d′*, of the connecting-bar F, as hereinbefore set forth.

3. In a reversible horizontal steam-engine, the combination, with the eccentric-rods C C′, so connected with the valve rod or arm that their forward ends will descend when released, of the connecting-bar F, cord or rope *g*, and guide-pulleys *h*, for reversing the engine at a considerable distance therefrom, substantially as hereinbefore set forth.

JOHN V. TIFFT,
WM. C. BRYANT,
*Executors.*
WM. LOVE.

Witnesses:
JNO. J. BONNER,
EDWARD WILHELM.